April 21, 1931.  W. G. WOLFE  1,802,100
WIDE ANGLE LENS
Filed May 16, 1927
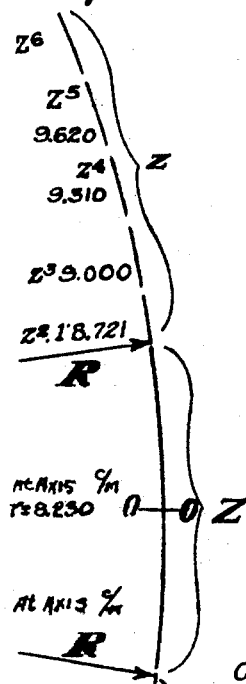
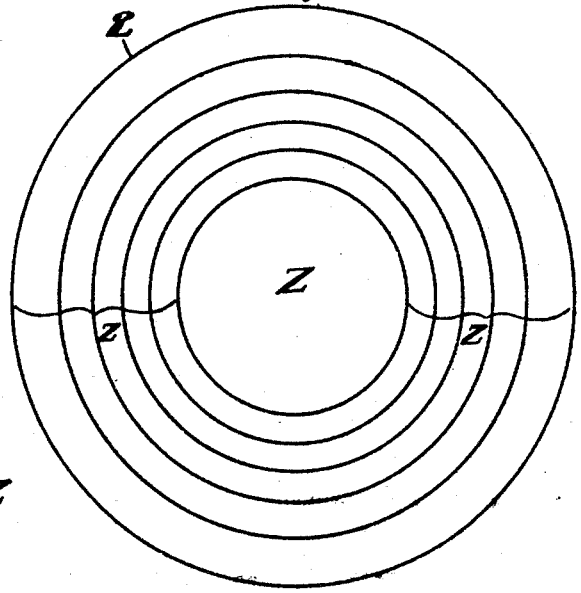
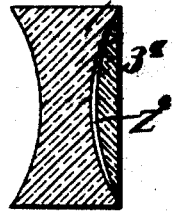
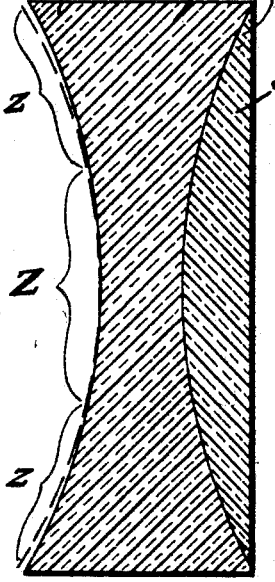
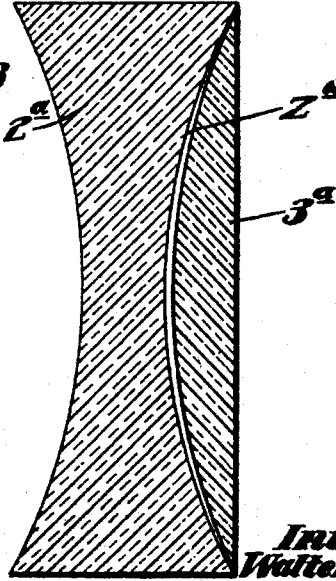
Inventor
Walter G. Wolfe
By Ellis Spear Jr.
Attorney Patented Apr. 21, 1931

1,802,100

UNITED STATES PATENT OFFICE

WALTER G. WOLFE, OF GREENWOOD, MASSACHUSETTS, ASSIGNOR TO WILMOT R. EVANS, TRUSTEE, OF BOSTON, MASSACHUSETTS

WIDE-ANGLE LENS

Application filed May 16, 1927. Serial No. 191,590.

My present invention relates to what I may term wide angle optics as including a broad field in which much work has been done but in which apparently much remains to be done. My invention is capable of various embodiments and a great variety of uses as it involves certain principles heretofore not recognized which I have been able to lay hold of and apply with a considerable degree of success.

Many optical propositions present such a wide and diversified field that discussion may best be limited to some particular application, especially where new principles are involved, and I have therefore selected the art of wide angle projection as the general province within which I will attempt to define my discussion and within that province will particularly point out the applicability of my invention to pictorial projection as upon a screen for observation by the human eye. There are many reasons why wide angle projection is very desirable, and in fact, it is one of the things that has been long and consistently sought. One of the constant difficulties throughout all such endeavor has been that of marginal distortion or the so-called "pin cushion or barrel" effect by reason of which the margin of the field of projection has been so distorted that anything like pictorial or photographic minutiæ have either been lost or so badly distorted as to spoil the effect.

This difficulty has been recognized to be due principally to spherical aberration and achromatism. The optical difficulties of correcting these singly and conjointly in wide angle optics have been so great that it has been heretofore supposed to be impossible to get practical results; that is to say, it has been, so far as I am advised, impossible to project a picture of large size from an ordinary slide or motion picture film from a short distance. A characteristic and extreme case of such projection is that of the moving picture which is projected from a very small photographic transparency under very high magnification to a size capable of being observed by a very large audience. This has been the reason that the projector has been placed in or behind the audience, in spite of the terrible and perfectly obvious risk of fire. Back stage projection was an obvious desideratum. It was an old practice from the earliest days of picture projection of comparatively large size lantern slide plates, but with the limitations of space behind the proscenium arch and the requirements of high magnification of minute motion picture film, practical results were utterly impossible.

In applying my invention to this field, I devised a novel lens or lens system which I will proceed to describe as both illustrative and as an embodiment of great value and of immediate usefulness and importance. Inasmuch as it involves a factor of safety for human life I make my disclosure with all promptness and without those delays which prudence would dictate in confirmatory experimentation and scientific investigation which would aid me to more fully establish novel principles which are doubtless present, but which I doubtless only imperfectly sense at this time. In this I rely upon the protection of the law and that discretion of the courts on which I must depend in awarding me full protection against such lack of detail as the emergency of my disclosure may necessitate.

Owing to the nature of my invention the drawings are necessarily somewhat exaggerated in order to make the details of optical finesse observable and understandable, but I believe such drawings will be readily comprehended by those reasonably skilled in the art and they do with some pictorial exaggeration fairly represent actual optics made by me and under successful operation. Throughout the specification and drawings like reference characters are employed to indicate corresponding parts, and in the drawings:

Fig. 1 is a face diagram of a lens in accordance with my invention.

Fig. 2 is a curve diagram of such a lens section.

Fig. 3 a diagrammatic section of a lens form.

Fig. 4 is a similar view of a modified form thereof, and

Fig. 5 a modified form of aspheric correction.

Wide angle projection lenses for detail such as pictorial or photographic minutiæ have generally been considered as impossible optics from the practical point of view. This was due to the extreme spherical aberrations involved, as well as to chromatic difficulties. Optical science has, of course, known how to correct for aberration and how to correct for color. Nevertheless, to the best of my knowledge and belief this knowledge has not been deemed applicable to produce practical results as required in this art. This is due to the difficulties in conditions and requirements between large lenses such as astronomical lenses and relatively smaller optics such as the projection art requires. Furthermore, in the projection art there is the extreme difficulty of definiteness in correction sufficient to maintain detail without disturbing continuity of pictorial effect.

Referring to Fig. 1, the lens 2 has for example a central spheric surface as indicated as a central zone Z. Beyond that surface is a modified surface or annular portion indicated by $z$. Such an annular surface has been generally known in optics but generally in connection with large lenses where an aspheric surface is produced by working down the margins of a spheric. I mention this because while such a general surface has been known and while it might be though to have a theoretical application to my present invention, it is not a practical surface utilizable as such and my invention consists in part in a modification of this surface to get those results which make a new and revolutionary combination of projector screen and even theatre itself possible.

At this point attention is invited to the diagram shown in Fig. 2. This may be considered as the line of curvature from the center outwardly O—O indicating the optical axis. In this we may consider the portion between the radii R as a spheric and the elements $z$ of the broken line extended beyond as indicating the plurality of surfaces each more divergent from the curvature of the sphere and each preferably of an increasing length as indicating a zone of greater breadth. Instead, therefore, of the continuous curvature of the lens margin outside of the spherical portion Z, my lens has what may be considered as a plurality of definite annular surfaces constituting as a whole a general hyperbolic trend of the surface but different therefrom from the fact that they are definite independent optical surfaces of perfectly definite values. It is only possible to treat these surfaces diagrammatically because they are very narrow surfaces and their very narrowness is a factor which will be readily understood by those skilled in the art from the following.

The treatment of light by optics involving definite annulæ necessarily results in the projection of differentiated rings on the intercept, as for example, on the screen. By making these optical annulæ, however, sufficiently narrow so that the rings on the intercept are of a width within the range of distinct vision, I find it possible to use these definite surfaces $z$ to eliminate spherical aberration to an extent that it is ignorable and without in the slightest disturbing the interpretive value of pictorial effects distributed zonally. By my invention I am able to get as clear and undistorted a picture at back stage distance (say 19 or 20 feet) as at projection from the back of the hall (at say 75 or 80 feet).

In the matter of optics involved, it will be seen that the successive surfaces $z$ produce in general that hyperbolic tendency heretofore attained by the very delicate correction of a spherical lens. My lenses may therefore be considered generally as aspherics but the mathematical definiteness of the successive annulæ must be borne in mind. I do not mean by this that the annulæ need to be maintained in true planes nor that they intersect each other sharply. I mean they must be of progressive divergence considered as planes and preferably of increasing width but of a sufficient narrowness to give on the picture a zonal width within the limits of distinct vision.

The lens illustrated in Figs. 1, 2 and 3 is such a lens intended for use with a projection objective, such for example as that used in the ordinary moving picture machine. It is a negative and the lens described would be mounted in advance of the said projection objective and about 8 inches from it, or at such position as to efficiently receive the projected beam. The member 2 is a bow silicate crown n/d 1.5126 v 62.7. The curvature of the zones Z, $z$, are respectively for Z 8.230 c/m. For over the zone $z$ as indicated by the broken lines, embraced by the bracket in Fig. 2, the curvature would be for $z^2$ r 8.721; for $z^3$ r 9.000; for $z^4$ r 9.310; for $z^5$ r 9.620; and for $z^6$ (not applied to the drawing for lack of space) r 9.931. $z^7$ would be r 10.000, $z^8$ r 10.414.

This may be taken as a typical modification but is given as an entirely practical one for the purpose used, i. e. for moving picture projection. The diameter of the lens described is 12.70 c/m. The contact concavity of the member 2 has a complete radius 8.230 c/m and receives the plano convex member 3 which has a curvature of that radius spherical and in contact in the form shown. The rear face is plano and its thickness at center is 2 c/m. This is flint glass n/d 1.6041 v 37.8. The mean dispersion of the member 2 is C to F .00818. Partial dispersion .00245, C to D; .00573 D to F; .00460 F to G. For the flint member 3, mean dispersion .01599 C to F; partial dispersion .00457 C to D; .00142 D to F; .00969 F to G.

A standard projector lens which is usually of three-inch focus projects a picture about twenty-one feet square at a distance of seventy or eighty feet. For such I provide a system consisting of a crown member 2 which I preferably form as a double concave lens the rear or first face having full negative curvature including a central surface Z surrounded by a series of annular surfaces $z$ as described in connection with 2. The second surface would be a weak negative. The flint member 3 as shown is a plano-convex. A second similar system may be used in practice to secure the desired corrected divergence and can be made to give a standardized size of picture of approximately twenty-one feet square at a distance of only seventeen feet. It may be noted by comparison that with the ordinarily projecting lens at such a distance a picture of approximately five feet square could be attained.

In the form shown in Fig. 4 the third surface, i. e. the flint member $3a$ may have its surface modified as at $Z^a$ to give the effect of the zonal corrections $z$ of Fig. 3.

In Fig. 5 the modified form carries the annular surfaces $Z^a$ on the flint member but in such form there is more difficulty in correcting color.

My invention is, of course, capable of all the variations of optical design common to lens production and is capable of all the chromatic corrections by the relative figuring of the flint member 3 and the crown member 2. My invention may be practiced with any translucent screen and my combination of projector and lens system, screen and theatre may be made to suit any varieties of architecture or setting arrangement.

What I therefore claim and desire to secure by Letters Patent is:—

1. A negative achromatic lens inclusive of a concave side having a central spherical surface and a plurality of concentric ring-like surfaces disposed outwardly of said central spherical surface, said ring-like surfaces being spherical and progressively increasing in focal length toward the edge of the lens.

2. A negative achromatic lens inclusive of a concave side having a central spherical surface and a plurality of concentric ring-like surfaces disposed outwardly of said central spherical surface, said ring-like surfaces being spherical and progressively increasing in width and in focal length toward the edge of the lens.

3. A negative achromatic lens inclusive of a concave side having a plurality of concentric ring-like spherical surfaces progressively increasing in focal length toward the edge of the lens.

4. A negative achromatic lens inclusive of a concave side having a plurality of concentric ring-like spherical surfaces progressively increasing in width and in focal length toward the edge of the lens.

5. A negative achromatic lens inclusive of a concave side having a central surface and a plurality of concentric ring-like surfaces disposed outwardly of said central surface, said ring-like surfaces being spherical and progressively increasing in focal length toward the edge of the lens.

In testimony whereof I affix my signature.

WALTER G. WOLFE.